US012740543B1

(12) United States Patent
Riggs, Jr.

(10) Patent No.: US 12,740,543 B1
(45) Date of Patent: Sep. 22, 2026

(54) METHOD AND PRODUCT FOR PET WASTE CLEANUP

(71) Applicant: Charles T. Riggs, Jr., River Forest, IL (US)

(72) Inventor: Charles T. Riggs, Jr., River Forest, IL (US)

( * ) Notice: Subject to any disclaimer, the term of this patent is extended or adjusted under 35 U.S.C. 154(b) by 399 days.

(21) Appl. No.: 18/199,082

(22) Filed: May 18, 2023

Related U.S. Application Data

(60) Provisional application No. 63/343,845, filed on May 19, 2022.

(51) Int. Cl.
*A01K 1/015* (2006.01)

(52) U.S. Cl.
CPC .......... *A01K 1/0155* (2013.01); *A01K 1/0154* (2013.01)

(58) Field of Classification Search
CPC ................ A01K 1/0152; A01K 1/0154; A01K 1/0155
See application file for complete search history.

(56) References Cited

U.S. PATENT DOCUMENTS

2005/0175577 A1* 8/2005 Jenkins .................... B01J 20/12 424/76.1
2005/0279290 A1* 12/2005 Hyland ................ E01H 1/1213 119/867
2008/0029039 A1* 2/2008 Jenkins .................... B01J 20/26 119/173
2009/0126644 A1* 5/2009 Thomas ............... A01K 1/0152 424/489
2014/0000526 A1* 1/2014 Kuras .................. A01K 1/0107 119/173

* cited by examiner

*Primary Examiner* — Yvonne R Abbott-Lewis

(57) ABSTRACT

A method and product assist with pet waste cleanup. The product comprises a mixture of a first component in the form of granules or powder, and a second component in the form of odor and/or moisture absorbing granules such as zeolite granules, which when poured onto dog poop facilitates the removal of the dog poop from tall grass or other surfaces. The mixture also assists in eliminating or reducing odor. The mixture may also include fragrance particles such as dried flowers or buds. The mixture is environmentally friendly and safe for use on lawns.

13 Claims, 3 Drawing Sheets

| | Mixture 1 | Mixture 2 | Mixture 3 | Mixture 4 | Mixture 5 | Mixture 6 |
|---|---|---|---|---|---|---|
| Component A | 51-99% | 70-90% | 75-85% | 51-98% | 66-81% | 70-80% |
| Component B | 1-49% | 10-30% | 15-25% | 1-37% | 15-23% | 16-19% |
| Component C | 0% | 0% | 0% | 1-12% | 4-11% | 4-7% |

Figure 3

METHOD AND PRODUCT FOR PET WASTE CLEANUP

RELATED APPLICATION

This application relates to and claims priority to U.S. provisional patent application No. 63/343,845 entitled Method and Product for Pet Waste Cleanup, filed May 19, 2022, the entire disclosure of which is incorporated herein by reference.

BACKGROUND

Pet owners frequently walk their dogs or take their dogs to a dog park or to other locations, or simply let their dogs out into a fenced yard for exercise and/or to urinate and/or poop. After a dog poops, the dog poop needs to be cleaned up, i.e., picked up and disposed of properly. Typically, a pet owner will use a dog poop bag which may come in a roll. The pet owner pulls and separates a single bag from the roll, and then using the bag like a glove, picks up the dog poop and secures it inside the bag, for example by tying a knot in the bag. The bag containing the dog poop is then disposed of in a trash can. The pet owner may use other disposable items such as disposable gloves, towels, etc., to pick up the poop and place it into a bag and/or into trash can.

However, dog poop clean up can be a difficult and messy process. For example, when the dog poop sits in tall grass, the dog poop can be difficult to remove from the tall grass, often times resulting in the ripping out of the grass and damaging the lawn, and/or remnants of the dog poop remaining in the grass. Further, the dog poop may be runny or soft or liquidly, making the dog poop difficult and messy to pick up. Additionally, once the dog poop is picked up and placed in a trash can, the dog poop can make the trash can and areas around the trash can smell really bad.

Accordingly, to address and overcome the above described difficulties and problems associated with dog poop clean up and disposal, a method, system and product is needed to make dog poop clean up and disposal easier and less messy and less smelly. The method(s), system(s) and product(s) disclosed herein fulfill such needs. It is desired that the presently disclosed method(s), system(s) and product(s) be applicable generally to any instances or applications involving the cleanup of pet and/or animal waste.

SUMMARY

The present disclosure relates to one or more method(s), system(s) and product(s) relating to pet poop clean up. The method(s), system(s) and product(s) of the present disclosure comprise a mixture of granules or the like which are sprinkled or poured onto pet poop to assist with the pickup of the poop from the ground, and especially from grass. The product preferably comprises a mixture of sand, and odor and/or moisture absorbing granules such as zeolite or zeolite-like substances. The mixture may also include fragrance particles such as all natural potpourri or dried flower particles or similar fragrance particles or granules. The product can be stored in a bottle, a bag or the like, and poured therefrom. After pouring onto the dog poop, the dog poop can be easily removed from the grass and disposed of properly while eliminating or reducing the smell. The product can be easily carried or otherwise transported to a desired location.

DESCRIPTION OF DRAWINGS

FIG. 3 is a chart illustrating examples of the components of the product of the present disclosure.

DESCRIPTION

Figure 1A:
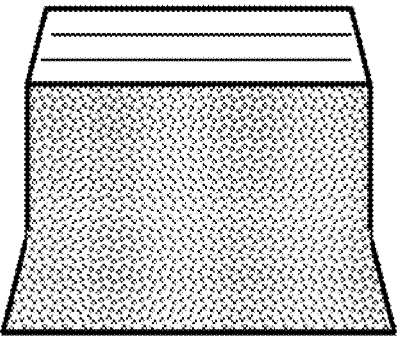
FIG. 1A is a picture of the product of a present disclosure in a bag.
Figure 1B:
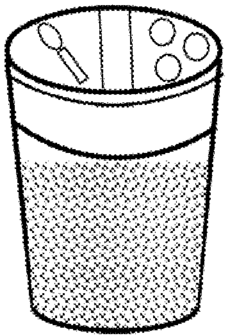
FIG. 1B is a picture of the product of the present disclosure in a bottle.

FIG. 1A Illustrates the mixture of the present disclosure contained in a bag. The bag may be re-sealable, and pulled open to access the mixture. Alternatively, the bag may be heated sealed and cut or torn open to access the mixture. In one embodiment, the mixture is contained in a dog poop bag. FIG. 1B illustrates the mixture of the present disclosure contained in a bottle having a lid or cap which may be removed or opened to access the mixture. The lid of the bottle may have one or more flaps which may be opened to access the material through one or more through holes. The lid shown in FIG. 1B includes two openable and closable flaps, one covering an opening on one side, and the other covering a plurality of through holes on the other side.

The mixture comprises 1) a granular material, preferably in the form of sand, and 2) odor and/or moisture absorbing material, preferably in the form of granules or powders. Preferably, the odor and/or moisture absorbing material is zeolite or a zeolite-like substance, Additionally, the mixture may include a fragrance material, preferably in the form of particles or granules. Preferably, the fragrance particles are potpourri, dried flowers, or flower buds, which may be crushed or otherwise formed into small pieces, granules or powder. In one embodiment, the fragrance particles comprise natural, dried flowers or buds such as lavender buds.

Figures 2A, 2B:
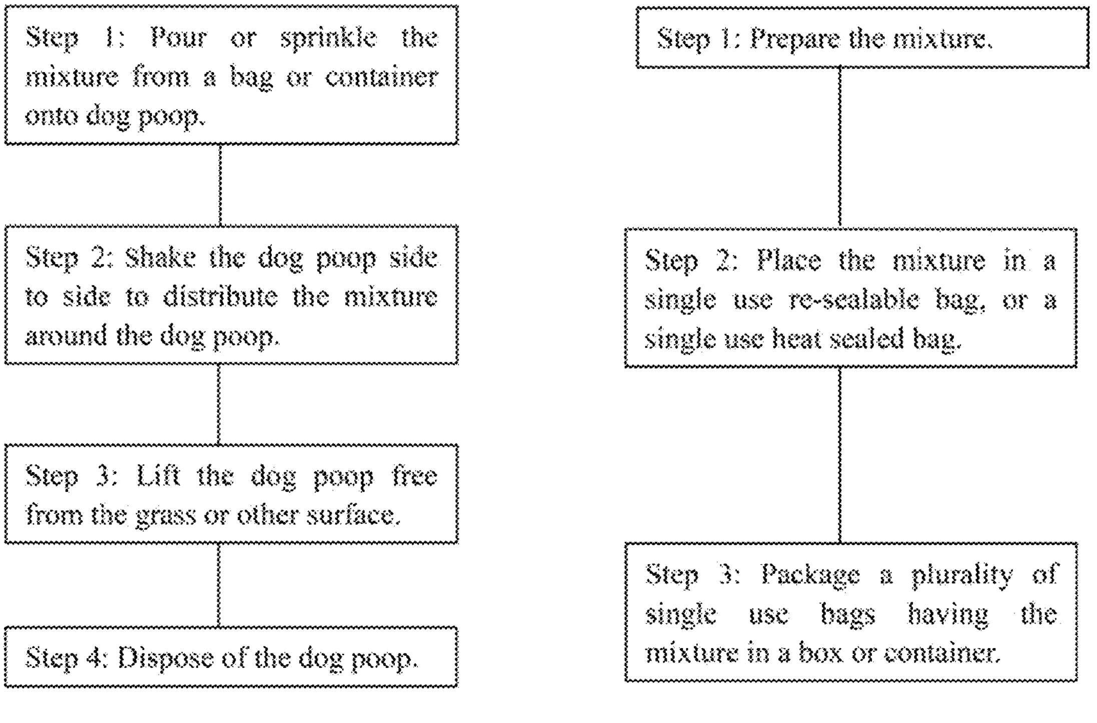
FIG. 2A is a flow chart of the method of use of the product of the present disclosure.
FIG. 2B is a flow chart of the method of packaging the product of the present disclosure.

In use in a preferred method, as illustrated in the flow chart of FIG. 2A, the mixture is poured from a bag (FIG. 1A) or sprinkled from a container or dispenser (FIG. 1B) onto the dog poop. The user then places the user's hand in a disposable glove, or a bag such as dog poop bag, which may be the bag containing the mixture. Next, the user shakes the dog poop side to side to distribute the mixture around the dog poop. Then, the user simply lifts the dog poop free from the grass or other location of the dog poop, with the mixture assisting in the removal as the granules on the dog poop easily slide through the grass along with the dog poop. Finally, the user properly disposes of the dog poop, with the mixture further assisting to both absorb the odor to eliminate or reduce the bad small, and to provide fragrance to mask or replace the bad smell with the smell of the fragrance.

As illustrated in the flow chart of FIG. 2B, the mixture may be packaged in a heat sealed or re-sealable dog poop bag for single use applications, wherein a user can simply grab one of the bags with the mixture, as may be sold in multi-bag boxes or other containers, use it as describe above, and then dispose of it in the trash. Alternatively, the mixture may be packaged in multi-use containers, such as a dispenser, which can be easily carried or transported by the user, for example in a 4 oz-16 oz bottle, or other sized bottle or container.

The mixture may include varying amounts of the different components. For example, the chart of FIG. 3 illustrates various examples of the mixture, wherein Component A is a granular or powder material such as sand, dried soil or dirt, pebbles or crushed or flaked rock, grains, oats, seeds or plant seeds, wheat, rice, sawdust, granulated corncobs, crushed peanut shells or other nut shells, chopped hay, grass, weeds or other plants, or a combination thereof. Component B is odor and/or moisture absorbing material such as zeolite, aluminosilicate minerals, molecular sieves, activated alumina, silica or silica gel, bentonite or bentonite gel or clay, granulated clay, starch, baking soda, flour, powder or baby powder, or a combination thereof, and Component C is fragrance material such as potpourri, dried, naturally fragrant plant materials, crushed/chopped pine cones, dried, chopped fruit rinds, herbs, spices, dried flowers particles or buds, or a combination thereof. Component C may also take the form of scented granules or powders such as soaps, cleaners, deodorizers and refresheners, so long as the scented granule or powder is environmentally friendly.

As illustrated in the table of FIG. 3, Mixture 1 comprises 51-99% Component A. 1-49% Component B, and 0% Component C.

Mixture 2 comprises 70-90% Component A, 10-30% Component B, and 0% Component C.

Mixture 3 comprises 75-85% Component A, 15-25% Component B, and 0% Component C.

Mixture 4 comprises 51-98% Component A, 1-37% Component B, and 1-12% Component C.

Mixture 5 comprises 66-81% Component A. 15-23% Component B, and 4-11% Component C.

Mixture 6 comprises 70-80% Component A, 16-19% Component B, and 4-7% Component C.

It is foreseen that other particles, granules, powders or additional components can be added to the Mixtures 1-6 without departing from the spirit and scope of the present disclosure. For example, the mixture can include one or more additional components of any suitable material or composition, without departing from the spirit and scope of the present disclosure.

In a preferred embodiment, the mixture may include five parts component A, for example 6-10 oz. of sand, one part component B, for example 1-3 oz. of zeolite, and optionally a fractional part of one part of component C, for example 0.0-1 oz. of lavender buds. More specifically for example, a 12.5 ounce batch of the preferred mixture may include 10 oz. of sand, 2 oz. of zeolite, and 0.5 oz. of lavender buds. Preferably, the sand is screened, washed and dried sand. The mixture preferably contains only components which are safe for lawns, i.e., which will not harm the lawn, plants, grass, etc., nor cause any environmental issues.

It should be understood that the components of the device(s) and method(s) disclosed herein can take any suitable form, including any suitable materials or components capable of adequately performing their respective intended functions, as may be known in the art. Further, while the embodiment(s) are illustrative of the structure, function and operation of the exemplary product(s) and method(s), it should be understood that various modifications may be made thereto with departing from the teachings herein.

While the foregoing discussion presents the teachings in an exemplary fashion with respect to the disclosed dog poop cleanup mixture and method of using the same, it will be apparent to those skilled in the art that the present disclosure may apply to any product or method used as a product for pet or animal waste cleanup.

Further, while the foregoing has described what are considered to be the best mode and/or other examples, it is understood that various modifications may be made therein and that the subject matter disclosed herein may be implemented in various forms and examples, and that the product(s) and method(s) may be applied in numerous applications, only some of which have been described herein.

What is claimed is:

1. A product for dog waste cleanup consisting of:

a mixture of a first component and a second component and a third component;

wherein the first component comprises sand;

wherein the second component comprises zeolite; and wherein the third component comprises lavender buds.

2. The product of claim 1, further comprising in combination a bottle for containing the mixture, wherein the bottle has a lid, wherein the lid has at least one opening, and wherein the lid has at least one cover portion for selectively coving the at least one opening.

3. The product of claim 1, wherein the mixture comprises 51-98% sand, 1-37% zeolite, and 1-12% of lavender buds.

4. The product of claim 3, wherein the mixture comprises five parts sand, one part zeolite, and a fractional part of one part lavender buds.

5. The product of claim 4, wherein the mixture is a batch proportionally comprising 10 oz. of sand, 2 oz. of zeolite, and 0.5 oz. of lavender buds.

6. A method of dog waste clean-up from a surface, comprising the steps of:

providing a mixture of sand, zeolite and lavender buds in a bottle having a lid with at least one opening and a cover portion for selectively covering the opening:

pouring the mixture from the bottle over the pet dog waste; and lifting the dog waste from the surface.

7. The method of claim 6, wherein the mixture comprises 51-98% sand, 1-37% zeolite, and 1-12% lavender buds.

8. The method of claim 7, wherein the mixture comprises five parts sand, one part zeolite, and a fractional part of one part lavender buds.

9. The method of claim 8, wherein the mixture is a batch proportionally comprising 10 oz. of sand, 2 oz. of zeolite, and 0.5 oz. of lavender buds.

10. A method of dog waste clean-up from grass, comprising the steps of:

providing a mixture of sand, zeolite, and lavender buds in a bottle having a lid with at least one opening and a cover portion for selectively covering the opening;

pouring the mixture from the bottle over dog waste;

shaking the dog waste before lifting the dog waste to distribute the mixture around the dog waste and within the grass; and lifting the dog waste from the grass.

11. The method of claim 10, wherein the mixture comprises 51-98% sand, 1-37% zeolite, and 1-12% lavender buds.

12. The method of claim 11, wherein the mixture comprises five parts sand, one part zeolite, and a fractional part of one part lavender buds.

13. The method of claim 12, wherein the mixture is a batch proportionally comprising 10 oz. of sand, 2 oz. of zeolite, and 0.5 oz. of lavender buds.

* * * * *